July 10, 1934.  L. J. CLAYTON  1,965,824
MACHINE FOR MOLDING HOLLOW RUBBER ARTICLES
Filed Oct. 13, 1930  2 Sheets-Sheet 1
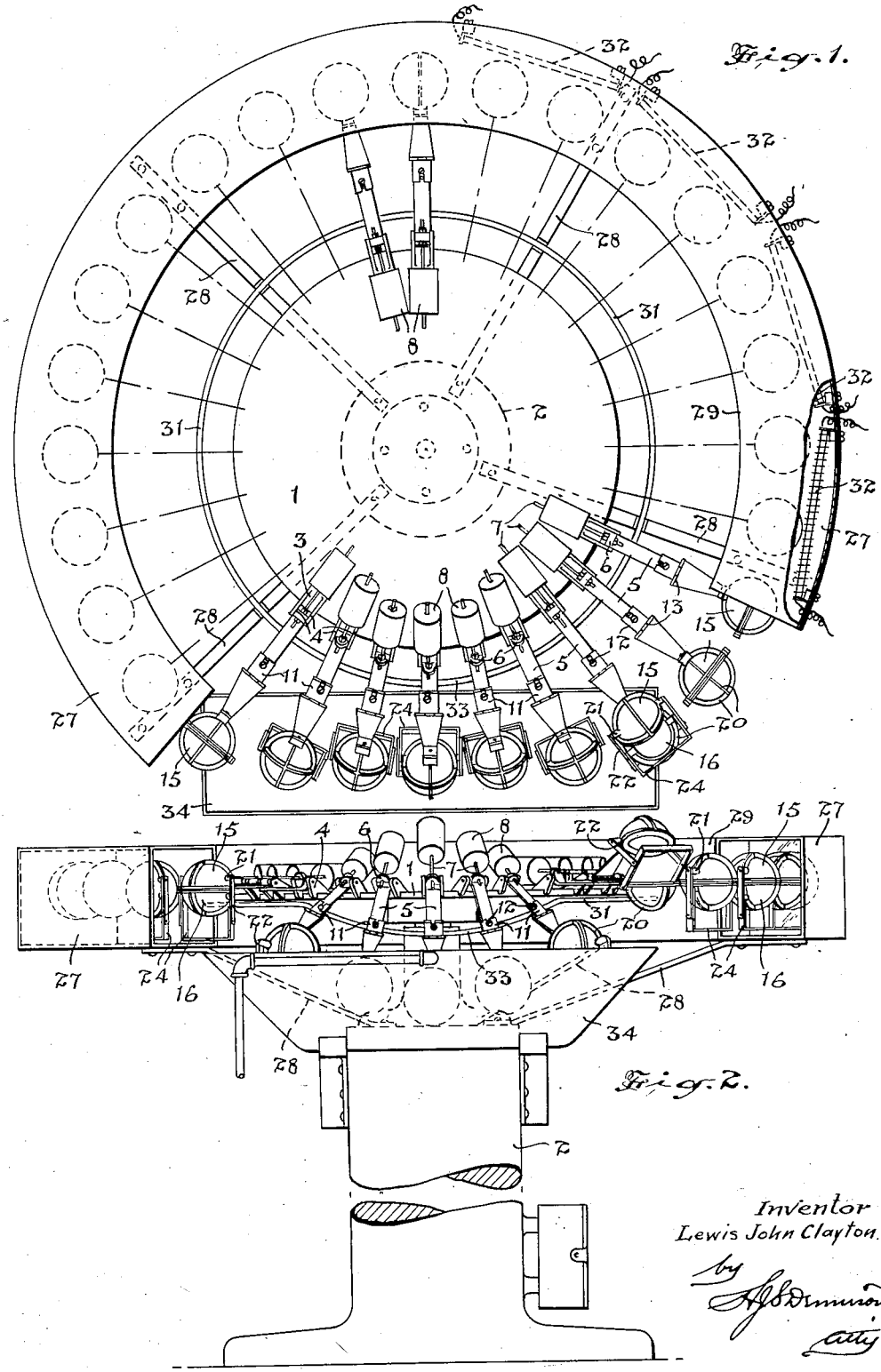
Inventor
Lewis John Clayton.

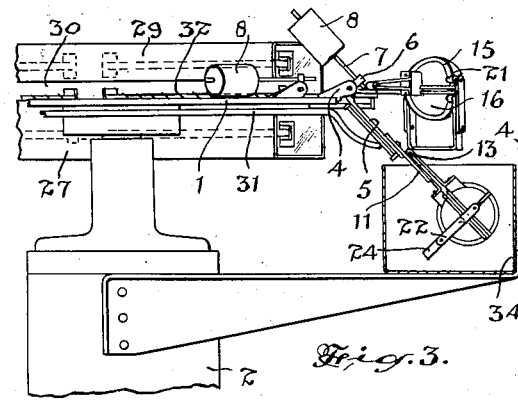
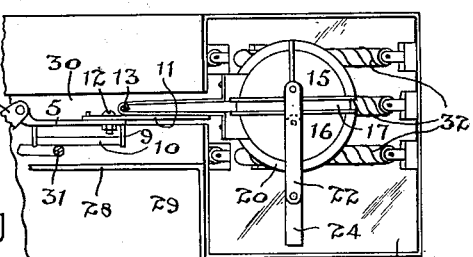
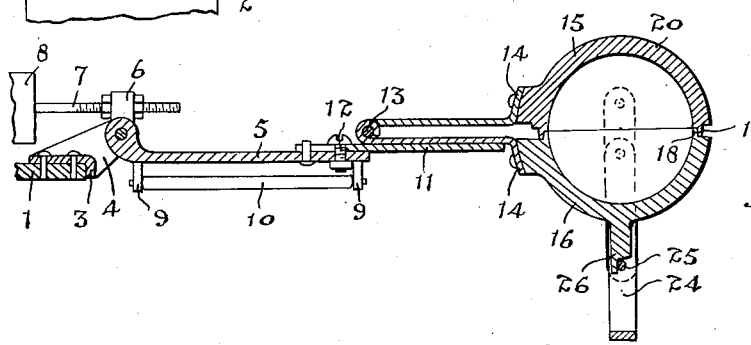
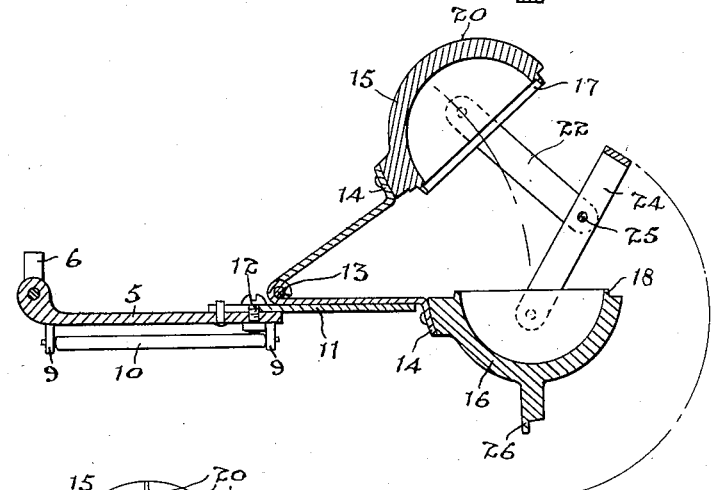
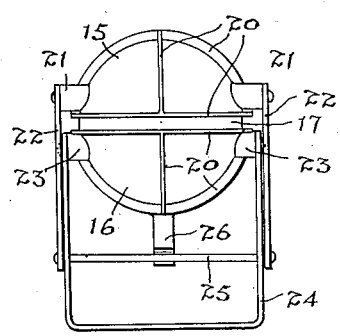
Inventor
Lewis John Clayton.

Patented July 10, 1934

1,965,824

UNITED STATES PATENT OFFICE 1,965,824

MACHINE FOR MOLDING HOLLOW RUBBER ARTICLES

Lewis John Clayton, Toronto, Ontario, Canada, assignor to Viceroy Manufacturing Company, Limited, Toronto, Ontario, Canada Application October 13, 1930, Serial No. 488,302

6 Claims. (Cl. 18—6)

The principal objects of the invention are, to effect a material saving in the cost of production of hollow rubber articles, and to provide means for greatly increasing the production of such goods.

A further object is to provide a machine which may be operated with the minimum expenditure of labor and which will maintain continuous production.

A still further object is to provide a machine which will utilize electric current for the production of the necessary heat to effect a curing of the rubber in the mold and to so arrange the heating elements as to require the minimum expenditure of current.

The principal features of the invention consist in the novel arrangement of a plurality of molds and of the novel construction and arrangement of a heating chamber through which said molds pass, whereby the radiant heat from electric heating elements is concentrated upon the molds in passage through a circular chamber and the heat imparted to the molds and to the atmosphere of the chamber is continued after the molds have passed beyond the actual heat-imparting zone of the heating elements to maintain a temperature for a definite period sufficient to effect the curing of the rubber within the mold.

A further and important feature of the invention consists in the novel construction and arrangement of the mold-supporting members and of the molds, whereby they are progressively cooled to permit the removal of the cured article therefrom and the introduction of a new uncured article thereto without interrupting the progressive movement thereof.

In the accompanying drawings, Figure 1 is a plan view of the machine.

Figure 2 is a front elevational view.

Figure 3 is a side elevation and part sectional view through the cooling tank.

Figure 4 is an enlarged elevational view of one end of the heat chamber showing a mold entering same.

Figure 5 is an enlarged longitudinal vertical mid-sectional view of one of the molds.

Figure 6 is a view similar to Figure 5 showing the mold in the open position.

Figure 7 is a front elevational view of one of the molds.

In the manufacture of hollow rubber articles, particularly those that are gas inflated it is the practice to form what is known as the "biscuit" containing gas producing pellets which under the heat of vulcanizing develop an inflating gas. These "biscuits" are placed in the cavities of multiple molds which are usually steam heated.

The operation of placing the biscuits between the molds, then heating the molds to a vulcanizing heat and retaining them heated for the required period and then cooling them sufficiently to enable their being handled to remove the finished articles, requires a considerable period of time and as the molds are extremely heavy they can only be handled by men and with the use of special apparatus.

The present invention comprises a plurality of individual molds formed with the least possible amount of metal and these are directed through a heating chamber, being progressively loaded with the prepared "biscuit" prior to entering the heating chamber.

In the form of the invention herein shown a horizontal disc 1 is rotatably mounted upon the top of a suitable standard 2 and it is rotated at a uniform slow rate of speed by any suitable form of mechanism, preferably by an electric motor operating through a suitable reduction gear.

Mounted upon the disc 1 at uniform distances apart and projecting beyond the periphery of the disc are the bracket members 3 which have a pair of parallelly arranged lugs 4.

Between each pair of lugs is pivotally mounted an arm 5 and each arm is provided with an upwardly extending lug 6 in which is mounted the threaded stem 7 of a counterbalance weight 8.

A pair of lugs 9 project downwardly from each arm 5 and between these lugs is mounted a roller 10 which forms a roller bearing support for the arm.

Extension members 11 are secured to the outer ends of each of the arms 5 by the bolts 12.

A hinged member 13 is secured to each of the arm extensions 11 and each member thereof is formed with a flange 14 to which are secured the half sections 15 and 16 of the molds.

These molds are formed with interlocking flanges 17 and 18 at their meeting edges.

The body material of the mold is made as thin as possible and preferably of aluminium or any other metal which is a quick conductor of heat.

Circumferential ribs 20 are arranged both horizontally and vertically to stiffen the metal of the mold sections to prevent warping.

The upper sections 15 are provided with a pair of laterally extending lugs 21 to which are pivotally secured the links 22 and the lower mold sections 16 are provided with a pair of shorter lugs 23 to which are pivotally secured the ends of the U-shaped bars 24.

A rod 25 extends across the U bar and pivotally connects the ends of the links 22 thereto.

Stop lugs 26 extend downwardly from the bottom sections 16 and engage the cross rods 25 when the U member 24 has been swung to its downward position when the mold is locked securely.

The closing and locking action of the U bar 24 and links 22 is clearly illustrated in Figures 5 and 6.

A heating chamber 27 of substantially rectangular form in cross section is formed in a part circular formation and is supported by the arms 28 extending radially from the standard 2.

The inner side 29 of the heat chamber is formed with a slot 30 through which the supporting arms 11 carrying the molds extend.

A bar 31 which is also supported by the arms 28 forms a bearing support for the rollers 10 on the underside of the arms 5 and guides the arms to travel horizontally carrying the molds through the interior of the heat chamber.

The heat chamber is preferably made of sheet metal having a highly polished inner surface and mounted within the heat chamber are a plurality of radiant electric heating units 32 which are preferably in the form of coils of resistance wire mounted on horizontal rods.

Several of these heat units are arranged within the interior of the heating chamber and they are so placed as to afford the very best possible distribution of heat generated therein.

The bar 31 is arranged with its major portion horizontal but the portion of the bar between the ends of the heating chamber is bent downwardly in the form of a shallow curve 33 and the mold carrying arms rolling on said bar when reaching the downwardly curved portion, swing sharply downward.

A shallow tank 34 is arranged in alignment with the discharge end of the heating chamber and contains a quantity of cooling water and is adapted to cool the molds as they emerge from the end of the heating chamber and swing downwardly.

The molds are coated on the outer surface with a suitable dead black coating to ensure the maximum heat absorption.

When the molds pass into the heating chamber they are first subjected to the direct heat of the visible red and infra-red heat rays of the heating elements and such rays emanating from the heating elements are reflected from the inner surfaces of the heating chamber and strike the molds on all sides.

In addition to the heat directly applied by the heat rays emanating from the heating elements the molds are enclosed within an atmosphere which is raised to high temperature mainly by conduction of heat from the various heated members, since the visible red and infra-red rays do not in themselves directly heat the atmosphere in passing therethrough, but only after absorption by the heat-absorbing surfaces, the rays heating the latter which in turn radiate a portion of the absorbed heat to the surrounding air.

It will be noted that the reflecting surfaces serve the very important function of concentrating the red and infra-red heat rays on the molds and that the molds in presenting dead black non-reflecting surfaces as described will very rapidly absorb the heat rays so that they will be heated with extreme rapidity to the desired vulcanizing temperature, the temperature of the air within the actual heat chamber surrounding the molds being of secondary consideration since the mold heating is accomplished mainly by control and absorption of the actual heat rays as set forth.

The presence of the reflecting wall of the heat chamber further ensures that the red and infra-red heat rays which would otherwise pass outwardly away from the molds to be absorbed by the casing wall are conserved and returned to be utilized by absorption by the mold surfaces so that extremely high efficiency and rapid curing is obtained in proportion to the energy consumed by the radiant heat elements.

The molds are raised to the desired maximum temperature by the heating elements arranged around the entrance portion of the heat chamber and the temperature required is retained by the heated atmosphere throughout the remainder of the passage of the molds through the heat chamber, that is to say, it is only necessary to apply heat by means of the radiant electric heating elements for a portion of the length of the heat chamber and the heat applied and absorbed by the molds is maintained so that the necessary curing is effected during the remainder of the travel of the mold through said chamber.

In the operation of the device herein described the central disc 1 carrying the radially arranged molds is operated at a predetermined speed. The molds are lifted out of the cooling bath and as they emerge the operator swings the U bar 24 outwardly which through the operation of the links 22 lifts the upper mold section clear of the lower one. The ball or other article which has been cured in the mold is removed therefrom and a fresh biscuit is inserted therein and the bar 24 is swung downwardly closing the molds together and locking them securely. This operation is completed before the mold reaches the entrance to the heat chamber.

The guide bar 31 raises the hinged bar carrying the mold so that the end thereof enters the slot 30 and supports the mold directly opposite the heating units 32. The heat from these units strikes directly against the mold and is absorbed thereby and it is also reflected by the inner walls of the polished casing to obtain the maximum absorption within the minimum time.

Several heat elements are arranged in a progressive arrangement to continue to apply the radiant heat until the maximum heat desired is acquired.

The molds continue to travel through the casing in the heated atmosphere until they finally emerge from the discharge end and the depressed curve 33 of the rod 31 allows the arms to drop so that the molds are immersed in the water of the cooling tank.

The temperature of the mold is thus very rapidly lowered and in the continued movement of the disc 1, which operates continuously, the molds are carried through the tank and are lifted therefrom by the upward slope of the curved rod 33 when the mold is opened as described and the completed article is removed therefrom and the mold is recharged.

It will be seen that quite a large number of molds are continuously in operation and the speed of movement of the rotating member is such as to enable the operator to discharge the completed article and recharge the molds successively without stopping the device.

The process is therefore continuous and the light weight of the molds enables their being very quickly heated to the desired temperature and also enables their being readily cooled to a temperature low enough to permit being properly handled and the volume of heat loss is reduced to the minimum.

The operation is extremely simple and can be performed without arduous labor and permits continuous operation of the mechanism, resulting in a very greatly increased output.

It will of course be understood that the device may be modified in construction to a very considerable extent. The number of the molds used may be varied as also may their individual construction without departing from the spirit of the invention.

What I claim as my invention is:—

1. A machine for molding hollow rubber articles, comprising a heating chamber having reflecting walls, radiant heat elements arranged within said chamber, a rotatable member, a plurality of hinged arms extending radially from said rotatable member, molds formed in separable halves secured to said arms, a guide adapted to support said arms to travel through said heat chamber and adapted to depress said arms upon emerging from the exit of said heat chamber, and a cooling bath arranged to receive the molds as they are depressed.

2. A machine for molding hollow rubber articles, comprising a part circular casing having a slot in its inner wall, a plurality of heating elements arranged within said casing adjacent to its entrance end, a rotatable member mounted concentric to said casing, a plurality of arms extending radially from said rotatable member, molds carried on said arms adapted to move through said casing, means for guiding said arms through the slot in said casing, a cooling bath arranged between the open ends of the casing, and means for guiding the arms to immerse the molds in the bath.

3. A machine for molding hollow rubber articles, comprising a part circular casing having a slot in its inner wall, a rotatable member mounted axially of the casing, a plurality of hinged arms extending radially from said rotatable member and adapted to extend through the slot in said casing, a plurality of thin walled metal molds formed in half sections mounted on said arms, means for locking said half sections of molds, means for guiding said arms to direct said molds through the casing and means for applying heat to said molds during their passage through the casing.

4. In a machine for molding hollow rubber articles, a rotatable member, a heat chamber, a cooling chamber, a plurality of arms pivotally secured to said rotatable member each having a mold mounted at the outward end, and a guide track engaging said pivotally mounted arms and guiding the same to carry the molds through said heating and cooling chambers.

5. In a machine for molding hollow rubber articles, a rotatable member, a heat chamber, a cooling chamber, a plurality of arms pivotally secured to said rotatable member each having a mold mounted at the outward end, means for counterbalancing the weight of said arms and molds, and means for guiding said arms to carry said molds through the aforesaid chambers.

6. A machine for molding hollow rubber articles comprising a part circular casing, a plurality of radiant heating elements arranged in said casing adjacent to one end only, a plurality of molds adapted to pass through said casing from end to end, means for moving said molds progressively through said casing to subject same first to the direct and reflected heat of said elements and thereafter to the heated atmosphere within said casing, and means arranged between the ends of said casing and external thereto for cooling said molds.

LEWIS JOHN CLAYTON.